Figure 12:
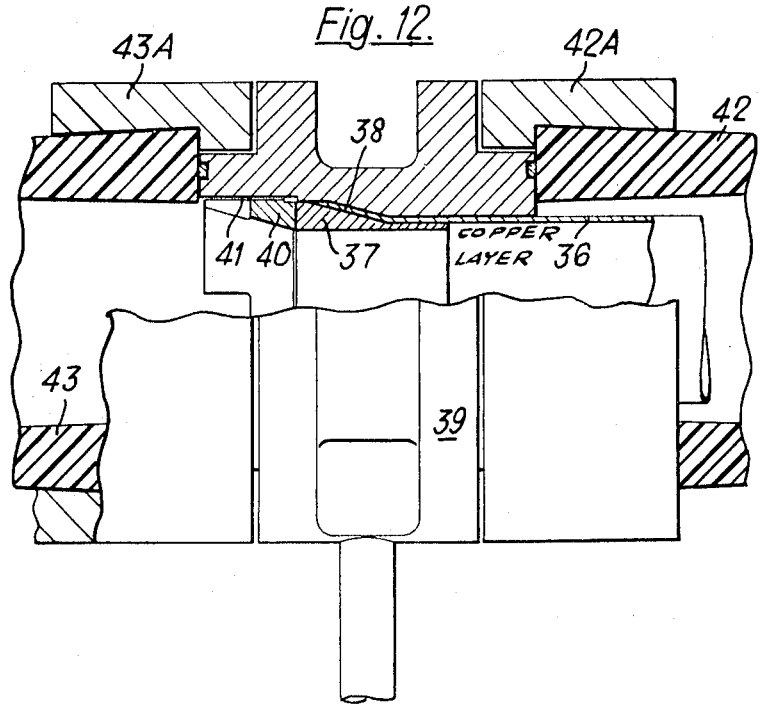

United States Patent

Swampillai et al.

[15] 3,636,233
[45] Jan. 18, 1972

[54] GAS INSULATED BUS BAR INSTALLATION

[72] Inventors: Christy Edward Selvanayagam Swampillai, Tadworth; Eric John Savage, Perivale; John Edward Lawton, London, all of England

[73] Assignee: British Insulated Callender's Cables Limited, London, England

[22] Filed: Nov. 10, 1970

[21] Appl. No.: 88,300

[30] Foreign Application Priority Data

Nov. 19, 1969  Great Britain .................... 56,712/69

[52] U.S. Cl. ........................... 174/16 B, 174/13, 174/15 C, 174/28, 174/99 B, 174/131
[51] Int. Cl. ................................................. H01b 9/06
[58] Field of Search ............... 174/15 C, 16, 16 B, 28, 29, 174/13, 99 B, 130, 131, 132

[56] References Cited

UNITED STATES PATENTS

| | | | |
|---|---|---|---|
| 3,391,243 | 7/1968 | Whitehead | 174/28 |
| 3,361,870 | 1/1968 | Whitehead | 174/99 B |
| 3,061,665 | 10/1962 | Rugg et al. | 174/99 B X |
| 2,644,028 | 6/1953 | Bernet | 174/13 UX |

FOREIGN PATENTS OR APPLICATIONS

| | | | |
|---|---|---|---|
| 762,595 | 4/1952 | Germany | 174/131 |
| 476,379 | 7/1969 | Switzerland | 174/28 |
| 74,178 | 3/1952 | Denmark | 174/28 |

Primary Examiner—Lewis H. Myers
Assistant Examiner—A. T. Grimley
Attorney—Webb, Burden, Robinson & Webb

[57] ABSTRACT

In a gas insulated phase bus bar system for service at or above 22 kv. and 1,000 A., the load-carrying conductor comprises an outer tube of high-conductivity metal and a plurality of inner reinforcing tubes longitudinally spaced apart by distances small in comparison with their lengths. Straight joints, expansion joints and terminations are also disclosed.

11 Claims, 15 Drawing Figures

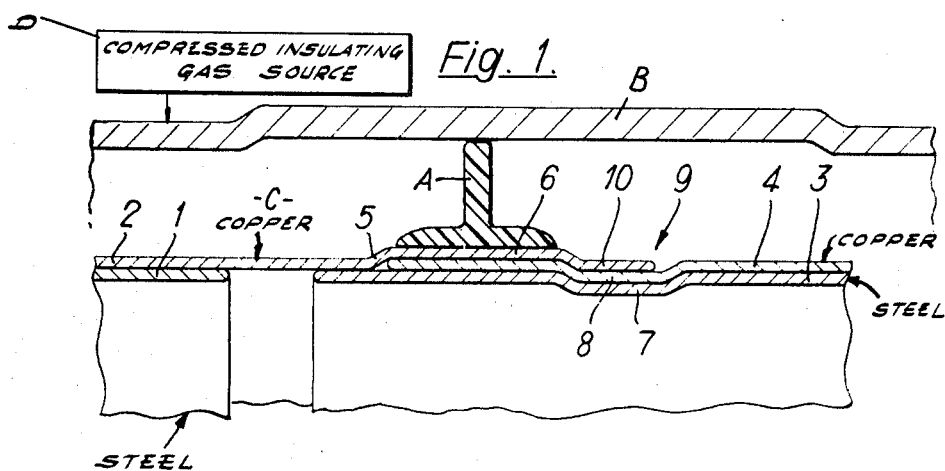
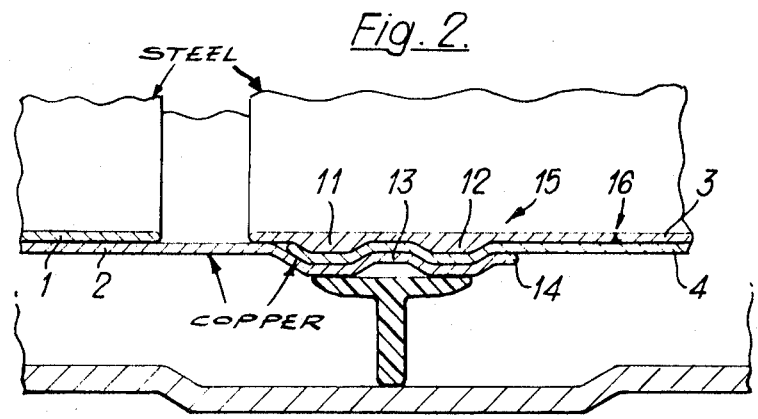
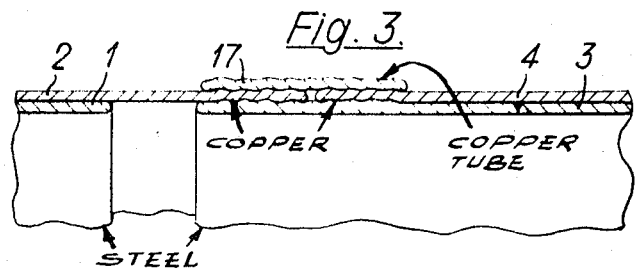
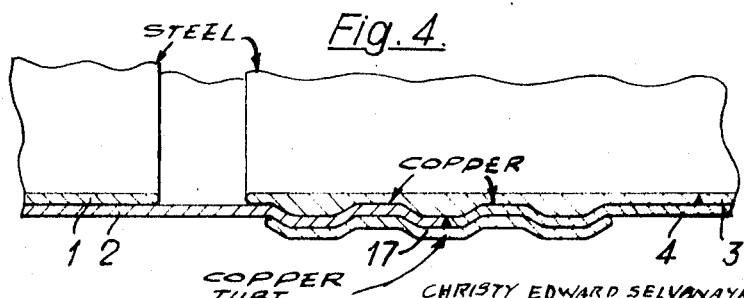

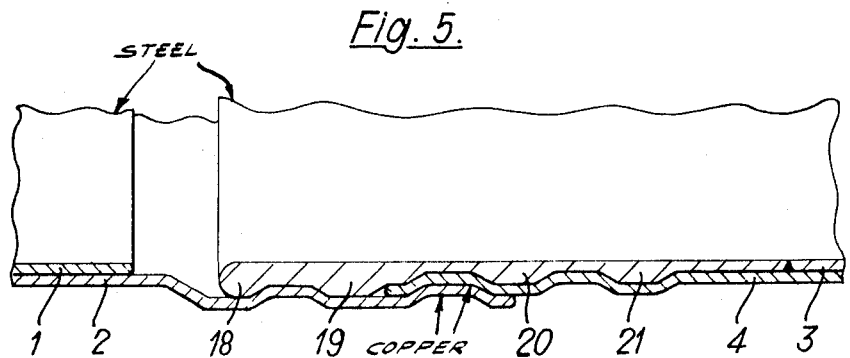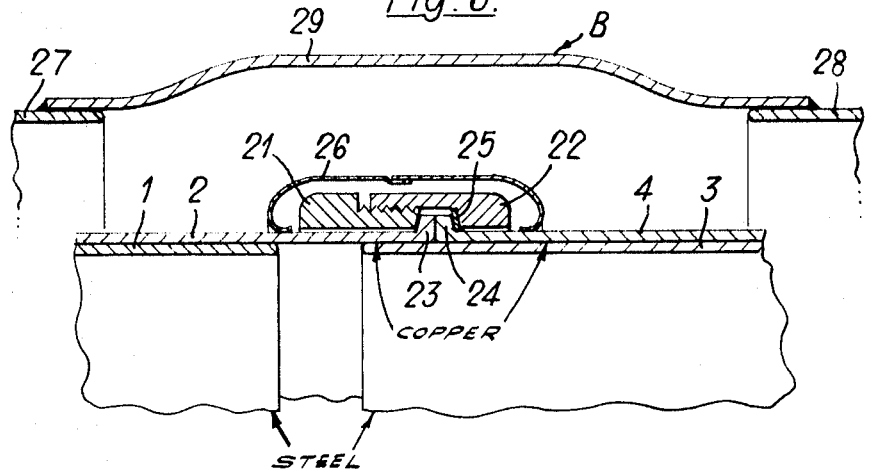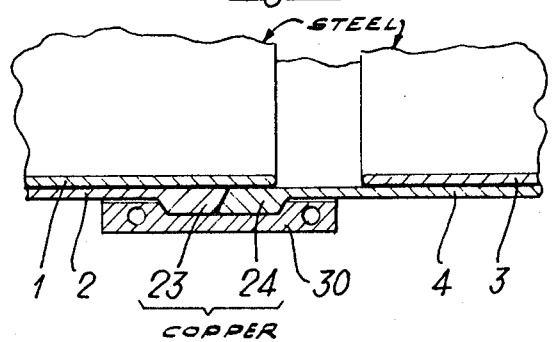

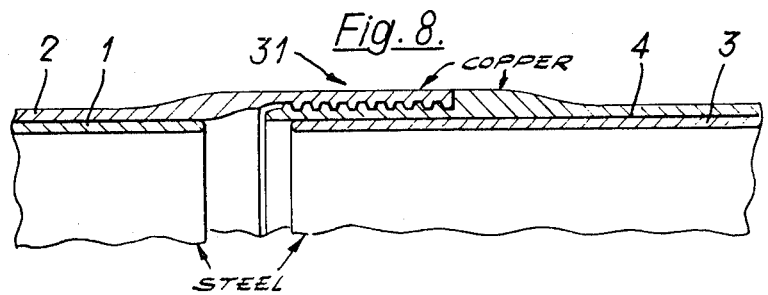
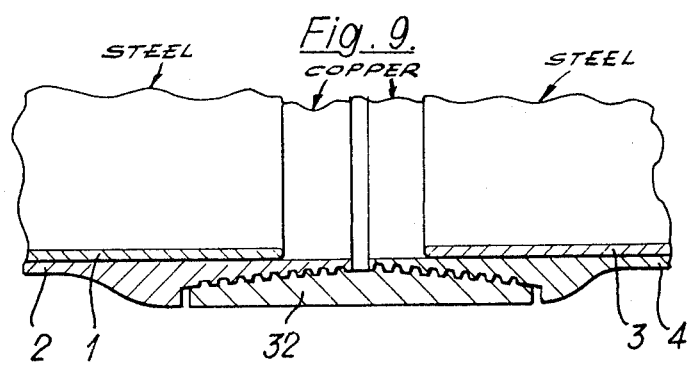
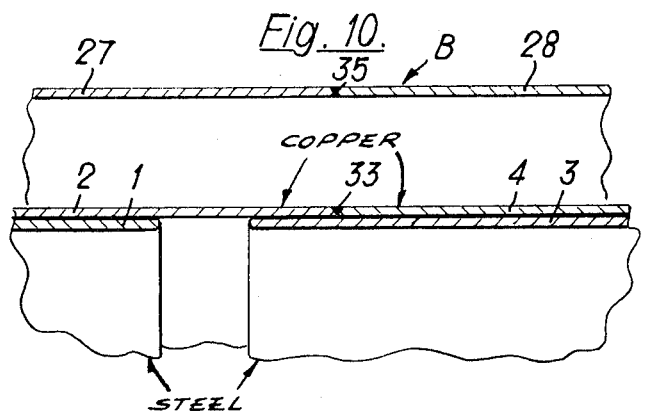
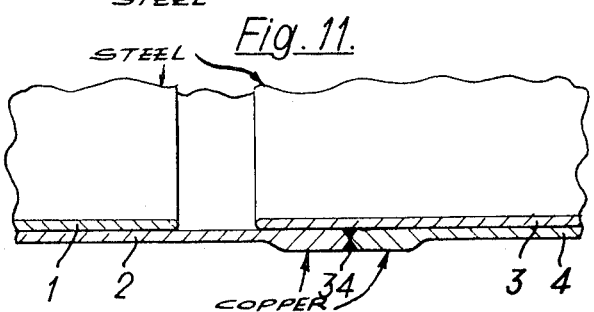

GAS INSULATED BUS BAR INSTALLATION

This invention relates to a gas insulated bus bar installation for transmitting electric power at high voltages and heavy currents, that is to say at voltages of 22 kV. and above and currents of 1,000 amps and above. More particularly it relates to an installation of this kind incorporating a bus bar or bus bars each comprising a tubular load carrying conductor mounted coaxially within a tubular outer enclosure and spaced therefrom a dielectric consisting principally of an insulating gas, the remainder of the dielectric consisting of an insulating support or supports spacing the conductor from the enclosure. The conductor may be supported by a series of spaced supports or by one or more supports extending longitudinally throughout the length of the installation, e.g. a number of plane radial fins for a single helical insulating spacer. The insulating gas will be at a pressure at least equal to and preferably much greater than atmospheric pressure. A pressure of at least 1 meganewtons per square meter (10 atmospheres) is preferred.

A principal object of the invention is to provide an installation of this kind, and bus bars and parts thereof for use in the installation, having improved mechanical properties.

In accordance with the present invention, the load carrying conductor comprises an outer tube of high-conductivity metal supported and reinforced by a number of longitudinally spaced inner tubes of a material having mechanical properties that are appropriate for this purpose, e.g. higher tensile strength and/or modulus of elasticity than that of the tube of high-conductivity metal, the longitudinal space between any two adjacent inner tubes being small in comparison with the length of either of these inner tubes.

The invention includes, in addition to bus bar installations, joints and terminations therefor and lengths of the composite conductor suitable for making such joints and terminations.

Lengths of the composite inner conductor can be made, for example, by extruding the outer tube as a close fitting sheath directly on the inner tube, by forming over or fitting on the inner tube an oversize outer tube and then dieing it down to make it a close fit, or by longitudinally or helically lapping one or more sheets or tapes of the high-conductivity metal onto the inner tube and welding the seam or seams to form a continuous covering.

Examples of bus bar installations in which the composite conductors of the present invention can be used are the subject of Reynolds et al. application Ser. No. 840,961 filed July 11, 1969 and of a proposed application Swampillai and Edwards corresponding to British application Ser. No. 56713/69.

The principal advantages of the use of the composite conductor in accordance with the present invention are that a mechanically stronger conductor is obtained without the use of an excessive amount of the relatively expensive high-conductivity metal and without introducing unacceptable stresses into the conductor as a whole, and especially in joints between lengths of the conductor, arising from the differing coefficients of thermal expansion of the materials of the inner and outer tubes. A further advantage when the composite conductor is cooled by circulating gas through it and through a heat exchanger is that the presence of gaps between the inner tubes may assist in obtaining turbulent flow, and so facilitate cooling.

The longitudinal spaces between the inner tubes will normally be located adjacent to or will coincide with joints between successive lengths of the outer tube and the conductor may be made up from lengths each consisting of a single outer tube of high-conductivity metal supported on a single shorter inner tube so arranged and of a length such that an unsupported shot length of the outer tube projects at one end of the assembly and an unsupported short length of the inner tube projects at the other end of the assembly; alternatively short lengths of the outer tube may project at both ends of the assembly.

The outer tubes are of copper or aluminum or high-conductivity copper or aluminum alloys. The inner tubes may for example be of a metal or alloy, e.g. steel or a high-strength aluminum alloy, or of nonmetallic material, for example resin bonded glass fiber or other fiber of high tensile strength.

The projecting ends of the outer and/or inner tubes may be specially shaped to facilitate jointing.

In one preferred form of joint, an end part of the outer tube of one section of the composite tubular conductor projects beyond the end of the inner tube thereof and is secured to at least the outer tube, and preferably also to the inner tube, of a contiguous section in such a way as to inhibit relative longitudinal movement. Preferably the inner tube of the contiguous section extends into the projecting end of the outer tube of the first section beyond the place where the two outer tubes are secured together.

Figure 13:
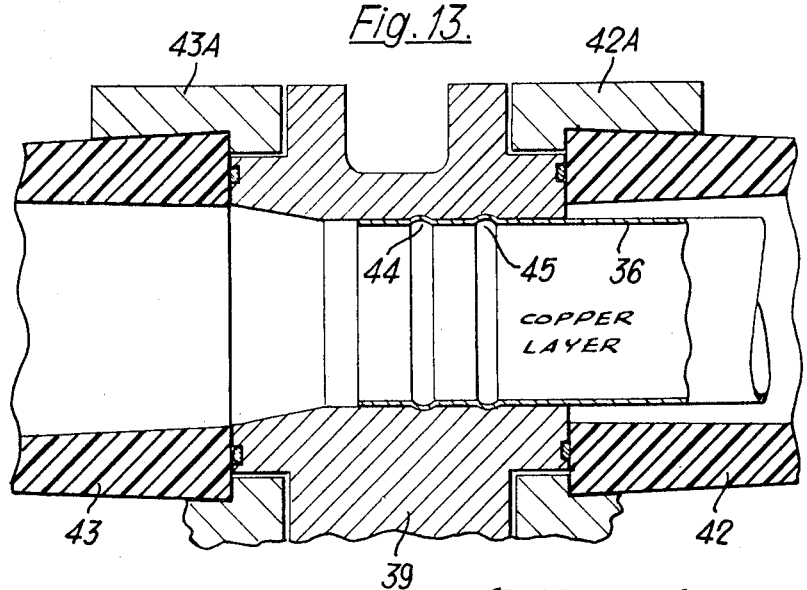
Figure 14:
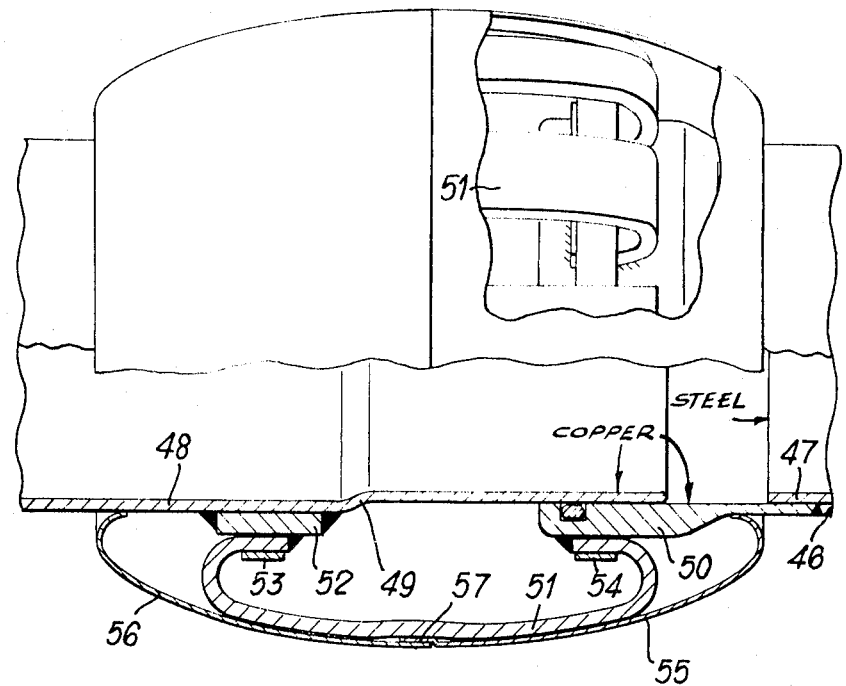
Figure 15:
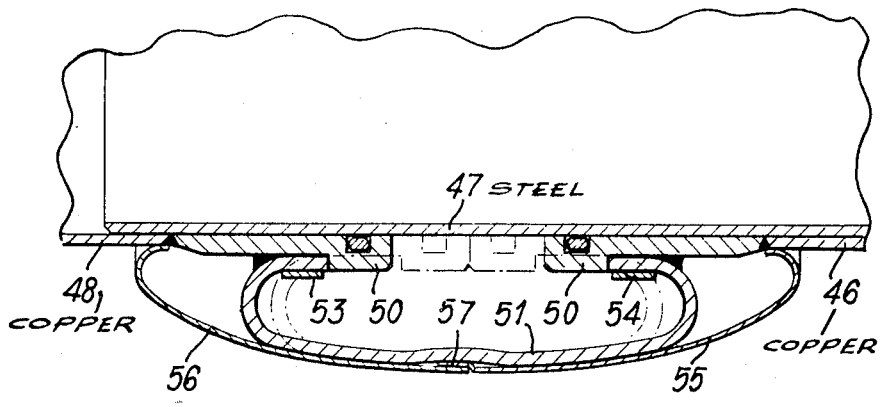

The invention will be further illustrated, by way of example, with reference to the accompanying drawings, in which FIGS. 1–11 are scrap cross sections of eleven different forms of joint in bus bar installations in accordance with the invention;

FIGURES 12 and 13 are cross sections through alternative forms of termination in accordance with the invention; and FIGS. 14 and 15 are cross sections through alternative forms of expansion joint in accordance with the invention.

In each of the joints shown in FIGS. 1 to 11, one length of length of load carrying conductor of the bus bar comprises an inner tube 1 of steel and an outer tube 2 of copper and the other length of load carrying conductor connected thereto comprises an inner tube 3 of steel and an outer tube 4 of copper. The bus bar is supported by insulating spacers A in an outer enclosure B defining a dielectric space C which is filled with compressed insulating gas from a source D.

In FIG. 1, the outer tube 2 is preformed with a shoulder 5 to provide a socket end 6 and the inner and outer tubes 3 and 4 are indented by swaging at 7 and 8 respectively to form a circumferential groove 9. After assembly of the two lengths, during installation, the free end 10 of the socket 6 formed at the end of the conductor 2 is swaged into the groove 9 to connect the two lengths together.

The joint shown in FIG. 2 is similar to that in FIG. 1 but, instead of swaging the inner tube 3 at 7, it is formed with ribs 11 and 12 over which the tube 4 is swaged and, during installation, the tube 2 is swaged at 13 and 14 to connect the two lengths together. The ribbed end 15 of the inner tube 3 can either be an integral part of the inner tube 3 or can comprise an extension piece welded on the plain tubular part at 16.

The joints shown in FIGS. 3 and 4 are basically similar to that of FIG. 2, except that in FIG. 3 multiple grooving is formed on the end of the inner tube 3 and that, in both types, the connection between the outer tubes 2 and 4 is made by means of a short copper tube 17 which is swaged over the ends of the tubes 2 and 4, during installation. Because the grooves in these Figures are defined by ribs, the end of the tube 2 will need to be enlarged before assembly to form a socket; in cases where the grooves are formed wholly by reduction in diameter, this will not be necessary.

The joint shown in FIG. 5 is similar to that of FIG. 2 except that there are four ribs 18 to 21 preformed on the end of the inner tube 3 and that the outer tubes 2 and 4 overlap only in the region between the inner two ribs 19 and 20.

In the joint shown in FIG. 6, the outer tubes 2 and 4 are interconnected by a pair of interengaging clamping nuts 21 and 22 which grip between them flanges 23 and 24 formed on the ends of the tubes 2 and 4 respectively. An antigalling PTFE washer 25 is inserted between the internal clamping surface of the nut 22 and the contiguous surface of the flange 24. A corona shield 26 is provided and it will be noted that in this joint the ends 27 and 28 of the outer tubular enclosure B of the bus bar are connected by a shaped bridging piece 29. The inner tube 3 preferably enters the end of the outer tube 2 to support the clamped connection.

The joint shown in FIG. 7 is similar to that of FIG. 6 but the interengaging nuts 21 and 22 are replaced by a two-part (longitudinally divided) sleeve 30 which fits over the two flanges 23, 24. The two halves of the sleeve 30 are bolted together to make the joint. A shield similar to 26 in FIG. 6 may be desirable.

The joint shown in FIG. 8 can only be used in situations where the inner conductors can be axially rotated relatively to each other to make a screw-threaded joint at 31 between the ends of the copper outer tubes 2 and 4. The threads are tinned to prevent galling.

The joint shown in FIG. 9 is similar to that of FIG. 8 but uses an internally threaded bridging piece 32 (with left- and right-hand threads) to draw the externally threaded ends of the outer tubes together, and hence eliminates the need to rotate the conductors.

The joints shown in FIGS. 10 and 11 use simple welded joints at 33 and 34 respectively, a weld between two lengths of the outer enclosure B also being shown at 35 in FIG. 10. In FIG. 11 the contiguous ends of the outer tubes 2 and 4 are increased thickness to secure better electrical conductance.

In the termination shown in FIG. 12, the end of an outer tube 36 of an inner conductor is gripped between an inner tapered ring 37 and a correspondingly tapered part 38 of the bore of a metal terminal block 39. Clamping is effected by applying an axial force to the inner ring 37 for example by an externally threaded locking ring 40 running in an internal thread 41 in the block 39. In terminations of this kind, the end of the outer tube that is clamped to the terminal will normally extend beyond the end of the inner tube. The block 39 is supported on an insulator sleeve 42 and a further insulator sleeve 43 acts as a duct for gas or other coolant flowing through the inner conductor. The insulator sleeves are secured by tapered collars 42A, 43A.

In the termination shown in FIG. 13 the outer tube 36 is attached to the bore in the terminal block 39 by swaging into circumferential grooves in the bore at 44 and 45. Insulators 42, 43 are used in the same way as in FIG. 12.

The joints shown in FIGS. 14 and 15 are straight joints connecting a copper conductor 46 having an internal steel reinforcing tube 47 to a copper conductor 48 not provided with reinforcement. This type of joint is especially suitable for leading-in to terminations, by means of a short length of the unreinforced copper conductor 48, because it provides a sliding joint which allows for relative movement caused by expansion of the reinforced and unreinforced conductors. Substantially identical joints can however be used if desired to form an expansion joint between two reinforced tubular conductors in accordance with the present invention.

Referring to FIG. 14, the end of the conductor 48 is swaged inwards at 49 to provide a sliding location within the upset conductor end 50 of the conductor 46. A series of flat braided conductors 51 are welded or brazed at intervals on the periphery of a collar 52 which is then welded to conductor 48. The braids are then further secured by a metal band 53, and bent in the shape shown after which they are secured by a further band 54 and welded or brazed to the outside upset end 50 of the conductor 46.

As expansion of conductors 46 and 48 takes place, the gap between them closes causing a rolling action of the braids to take place within the confines of a corona shield made from two halves 55, 56 and which may be attached to the braids at the joints 57 between the two halves.

The joint shown in FIG. 15 is similar but has the reinforcing liner 47 extended to reinforce the joint and both conductor ends are upset to provide enlarged ends 50. This drawing shows chain dotted the positions of the conductor ends and braid after the maximum intended expansion of the conductors.

In both these constructions, scuffing of the braids 51 is avoided and an almost constant radius of bend is maintained by the rolling action of the braids.

What we claim as our invention is:

1. An electric bus bar installation comprising
   A. a composite conductor comprising an outer tube of high-conductivity metal and a plurality of inner tubes reinforcing said outer tube, any two adjacent ones of said plurality of inner tubes being longitudinally spaced by a distance which is small in comparison with the length of either of said two inner tubes;
   B. a tubular outer enclosure concentrically surrounding said composite conductor; and
   C. in the annular space between said composite conductor and said tubular outer enclosure a dielectric consisting of (i) an insulating gas occupying the major part of said annular space and (ii) insulating support means spacing said composite conductor from said tubular outer enclosure;
   said dielectric having a dielectric strength at least sufficient to withstand a voltage of 22 kV between said composite conductor and said tubular outer enclosure and the outer tube of said composite conductor having a cross-sectional area sufficient to give said composite conductor a current-carrying capacity of at least 1,000 A.

2. An installation as claimed in claim 1 including means for maintaining said insulating gas at a pressure greater than 1 meganewtons per square meter.

3. An installation as claimed in claim 1 including means for producing turbulent flow of a gaseous coolant through the tubular conductor.

4. In an installation as claimed in claim 1 in which said composite conductor comprises a plurality of aligned sections, a joint between contiguous first and second sections of said composite conductor in which an end part of the outer tube of said first section projects beyond the inner tube thereof and is secured to the outer tube of said second section to inhibit relative longitudinal movement.

5. An installation as claimed in claim 4 in which said end part of the outer tube of the first section is also secured to inhibit relative longitudinal movement to the inner tube of the second section.

6. An installation as claimed in claim 1 including at least one termination comprising: a terminal block having a through bore; an end portion of the outer tube of a composite conductor expanded into said through bore; a first insulator sleeve surrounding said composite conductor and connected at one end to said terminal block and at its other end to a part of said outer enclosure that surrounds said composite conductor; and a second insulator sleeve connected to said through bore and constituting a coolant duct communicating with the composite conductor.

7. An installation as claimed in claim 6 in which the said through bore comprises a tapered part and including a correspondingly tapered inner ring and means for applying axial force to said inner ring to clamp said outer tube in contact with said tapered part of the bore.

8. In an installation as claimed in claim 1 an expansion joint in which said composite conductor is in telescopic engagement with another tubular conductor comprising a plurality of C-shaped flexible, braided conductors connecting the outer layer of said composite conductor to said other conductor, and a transversely divided corona shield surrounding all the braided conductors.

9. An installation as claimed in claim 8 in which each of said braided conductors is so shaped and positioned that it rolls on an inner surface of said corona shield when relative movement takes place between said composite conductor and the said other conductor.

10. An electric bus bar conductor section having a current-carrying capacity of at least 1,000 A. and comprising an outer tube of high-conductivity metal, at one end of said outer tube a socket defined by an enlarged portion thereof, a circumferential groove adjacent the other end of said outer tube, remote from said socket, and an inner reinforcing tube which is shorter than said outer tube, not counting the length of the socket as part of that length, by an amount which is small compared with the length of the section.

11. An electric bus bar conductor section having a current-carrying capacity of at least 1,000 A. and comprising an outer tube of high-conductivity metal and an inner reinforcing tube that is shorter than the outer tube by an amount which is small compared with the length of the section, a part of said inner tube projecting from said outer tube at a first end of the section, and there being at least one first circumferential groove in at least the outer tube adjacent said first end of the section and at least one second circumferential groove in said projecting part of the inner tube.

* * * * *

UNITED STATES PATENT OFFICE
CERTIFICATE OF CORRECTION

Patent No. 3,636,233            Dated    January 18, 1972

Inventor(s)    Christy Edward Selvanayagam Swampillai et al.

It is certified that error appears in the above-identified patent and that said Letters Patent are hereby corrected as shown below:

Column 1, line 9, after "therefrom" insert -- by --; line 15, "for" should read -- or --.

Signed and sealed this 16th day of May 1972.

(SEAL)  
Attest:

EDWARD M. FLETCHER, JR.           ROBERT GOTTSCHALK  
Attesting Officer                 Commissioner of Patents